United States Patent
Kamath et al.

(10) Patent No.: US 8,255,740 B2
(45) Date of Patent: Aug. 28, 2012

(54) MULTI-LEVEL DIMM ERROR REDUCTION

(75) Inventors: Vinod Kamath, Raleigh, NC (US);
Jason A. Matteson, Raleigh, NC (US);
Gregory J. McKnight, Bellevue, WA (US); Mark E. Steinke, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1 day.

(21) Appl. No.: 12/891,309

(22) Filed: Sep. 27, 2010

(65) Prior Publication Data
US 2012/0079314 A1  Mar. 29, 2012

(51) Int. Cl.
*G06F 11/00* (2006.01)

(52) U.S. Cl. ......... 714/6.1; 714/6.11; 714/42; 714/47.2; 714/54; 714/704; 711/106

(58) Field of Classification Search ............... 714/2, 5.1, 714/6.1, 6.11, 42, 47.1, 47.2, 54, 704; 711/104, 711/105, 106
See application file for complete search history.

(56) References Cited

U.S. PATENT DOCUMENTS

| | | | |
|---|---|---|---|
| 4,672,583 A | 6/1987 | Nakaizumi | |
| 4,935,900 A | 6/1990 | Ohsawa | |
| 6,199,139 B1 | 3/2001 | Katayama et al. | |
| 6,707,745 B2 | 3/2004 | Mizugaki | |
| 6,735,726 B2 | 5/2004 | Muranaka et al. | |
| 7,380,179 B2 | 5/2008 | Gower et al. | |
| 7,493,531 B2 | 2/2009 | Ito et al. | |
| 7,631,228 B2 | 12/2009 | Brittain et al. | |
| 2005/0281112 A1* | 12/2005 | Ito et al. ......................... 365/222 |
| 2007/0140030 A1* | 6/2007 | Wyatt ............................ 365/212 |
| 2008/0168313 A1* | 7/2008 | Blocksome et al. ............ 714/47 |
| 2008/0291630 A1* | 11/2008 | Monh et al. ................... 361/700 |
| 2009/0177932 A1* | 7/2009 | Abts et al. ..................... 714/704 |
| 2009/0193301 A1 | 7/2009 | Ito et al. | |
| 2011/0231697 A1* | 9/2011 | Berke et al. ....................... 714/3 |

FOREIGN PATENT DOCUMENTS
JP 22025299 A2 1/2002

OTHER PUBLICATIONS
Alchesky, "Single-Bit-Errors, A Memory Module Supplier's Perspective on Cause, Impact and Detection", Smart Modular Technologies, pp. 1-13.

* cited by examiner

*Primary Examiner* — Scott Baderman
*Assistant Examiner* — Joseph D Manoskey
(74) *Attorney, Agent, or Firm* — Cynthia G. Seal; Jeffrey L. Streets

(57) ABSTRACT

Embodiments of the present invention include computer-implemented methods for selectively applying remedial actions, according to a predefined order, for reducing the error rate in a computer memory system. In one embodiment, an ordered set of remedial actions are sequentially invoked in response to a single-bit error (SBE) in a DIMM reaching successive error thresholds. For example, in an air-cooled system, the remedial actions may include dynamically increasing a DIMM refresh rate, dynamically increasing a rate of airflow used to cool the DIMMs, and dynamically throttling the DIMMs. The remedial actions may be layered as they are successively invoked, to provide a cumulative remedial effect. At least two of the remedial actions may be simultaneously invoked in response to a multi-bit error rate reaching an associated threshold.

20 Claims, 4 Drawing Sheets

MULTI-LEVEL DIMM ERROR REDUCTION

BACKGROUND

1. Field of the Invention

The present invention generally relates to computer system memory, and more specifically relates to improving the performance, reliability, and efficiency of computer system memory.

2. Background of the Related Art

Computer system memory includes both long-term (non-volatile) and short-term (volatile) memory devices. Long-term memory devices, such as a hard disk drive (HDD), are capable of retaining software and data even in a powered-off state. Short-term memory devices, such as a Dual In-Line Memory Module (DIMM), are capable of retaining selected software instructions and data while in a powered-on state. Software instructions and data may be stored indefinitely in long-term memory and loaded on an as-needed basis to short-term memory for execution by a processor. The results from executing the instructions, such as processed data, may also be temporarily stored in the short-term memory for continued access during a powered-on computing session, or in long-term memory for access and processing in a subsequent computing session.

The performance of computer system memory affects the performance, reliability, and energy efficiency of the overall computer system in which the memory is used. For example, DIMMs consume energy during operation. DIMMs can also experience errors that affect their performance and reliability. As a DIMM error rate increases, the performance of the DIMM correspondingly decreases. A variety of techniques are known in the art for identifying and correcting errors to help ensure a DIMM continues to operate at an acceptable level. However, under abnormal conditions, DIMM errors may be severe enough to require a DIMM to be taken off line. Furthermore, if the DIMM error rate becomes too drastic, then the DIMM may require replacement, resulting in system downtime.

BRIEF SUMMARY

One embodiment of the present invention provides a method, comprising: monitoring a single-bit error rate in a memory module; automatically invoking a first of an ordered set of remedial actions in response to a first occurrence of the single-bit error rate reaching a threshold; and automatically invoking a next remedial action from the ordered set in response to each subsequent occurrence of the single-bit error rate reaching a threshold while maintaining any previously invoked remedial actions, wherein each remedial action invoked initially reduces the single-bit error rate to less than the threshold that invoked that remedial action. Optionally, the ordered set of remedial actions includes one or more of the group consisting of increasing a refresh rate of the memory module, increasing an air flow rate of an air moving device used to cool the memory module, and throttling the memory module.

Another embodiment of the present invention provides a method, comprising: monitoring a single-bit error rate in a memory module; automatically increasing a refresh rate using a memory controller in response to the single-bit error rate reaching a first threshold rate; and automatically increasing an airflow rate from an air moving device in response to the single-bit error rate reaching a second threshold rate while maintaining the increased refresh rate, wherein the air moving device is separate from the memory module and operable independently of the memory controller.

A further embodiment of the invention provides a computer program product including computer usable program code embodied on a computer usable storage medium. The computer program product comprises: computer usable program code for monitoring a single-bit error rate in a memory module; computer usable program code for automatically invoking a first of an ordered set of remedial actions in response to a first occurrence of the single-bit error rate reaching a threshold; and computer usable program code for automatically invoking a next remedial action from the ordered set in response to each subsequent occurrence of the single-bit error rate reaching a threshold while maintaining any previously invoked remedial actions, wherein each remedial action invoked initially reduces the single-bit error rate to less than the threshold.

DETAILED DESCRIPTION

Embodiments of the present invention include computer-implemented methods for selectively applying remedial actions to reduce the error rate in a computer memory system. In one embodiment, the remedial actions are sequentially invoked in response to a single-bit error (SBE) rate in a DIMM reaching successive error thresholds. For example, in an air-cooled system, the error-reducing remedial actions may include increasing a DIMM refresh rate, increasing a rate of airflow used to cool the DIMMs, and throttling the DIMMs. In a liquid-cooled system, the remedial actions may include increasing a DIMM refresh rate, increasing a liquid coolant flow rate, decreasing a liquid coolant inlet temperature, and throttling the DIMMs.

According to one aspect of the disclosed embodiments, the remedial actions may be layered as they are successively invoked to provide a cumulative error-reducing effect. In layering the remedial actions, one or more previously-invoked remedial actions are maintained as one or more additional remedial actions are successfully invoked in response to reaching each threshold. This approach may help maximize the up time of all available DIMMs in a memory system. This approach may also help minimize one or both of airflow and power consumption required to cool the DIMMs. The threshold based behavior allows for a refinement of the error management.

Figure 1:
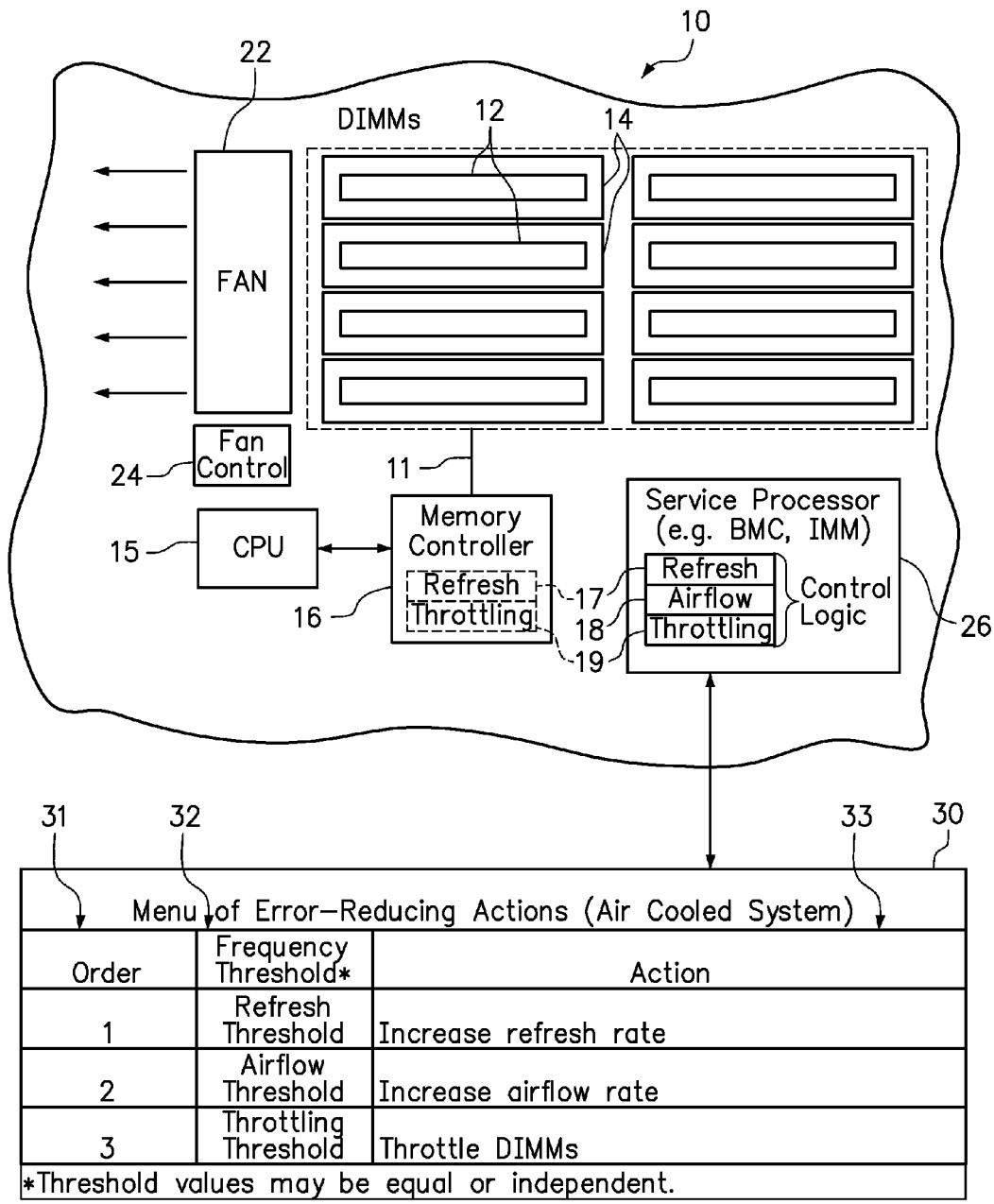
FIG. 1 is a schematic plan view of an air-cooled memory system implementing an error reduction method according to an embodiment of the invention.

FIG. 1 is a schematic plan view of an air-cooled memory system 10 for implementing a multi-level error reduction method according to an embodiment of the invention. The air-cooled memory system 10 includes, by way of example, eight DIMMs 12 arranged in a two-channel, four-slot-per-channel configuration. The DIMMs 12 are volatile memory for storing instructions executable by a CPU (central processing unit) 15 or data input to or output from the CPU. Each DIMM 12 interfaces with a circuit board 20 by a connection of the DIMM 12 to a DIMM socket 14. The circuit board 20 may be, for example, a motherboard of a rack-mountable blade server. A memory controller 16 is provided to read and write data to the DIMMs 12. The memory controller 16 is in electronic communication with the DIMMs 12 over a memory bus 11, which may comprise electronic pathways on the circuit board 20 such as traces etched on a substrate of the circuit board 20. The memory controller 16 resides on a separate circuit or chip in communication with the CPU 15, although the memory controller 16 may alternatively reside on the same chip as the CPU 15.

As generally understood in the art, each DIMM 12 includes a plurality of DRAM (Dynamic Random Access Memory) "chips" (not shown). Errors that may be experienced on a DRAM include both single-bit errors (SBE) and double-bit errors (DBE). Such errors reduce the reliability of devices such as computers, servers, and routers in which DRAM is used. Possible errors include permanent (hard) faults and non-permanent faults. A non-permanent fault may be categorized as either a transient or intermittent fault. A non-permanent fault may be defined to include both "intermittent" and "transient" faults. Intermittent faults are generally caused by non-environmental conditions, such as loose connections, noise, or aging components. Transient faults, however, are typically caused by environmental and other controllable conditions, such as temperature, voltage, humidity, pressure, vibrations, power supply fluctuations, electromagnetic interference, ground loops, cosmic rays, and alpha particles. Transient faults typically manifest as SBEs, which are therefore controllable in many instances through the control of other system and environmental variables. Multi-bit errors such as double-bit errors (DBE) may also be controlled to a limited extent. However, DBE tend to be more catastrophic for the system and are more likely to cause a system crash. Typically, corrective action must be taken within a comparatively short time window following the occurrence of a DBE.

The memory controller 16 contains features for reading, writing and correcting DIMM errors. These may include some conventional aspects known in the art for reading and writing data and for detecting and correcting errors. For example, DRAM included with the DIMMs 12 may include memory bits dedicated to error correction. The memory controller 16 may use these bits, such as to record parity or to use an error-correcting code (ECC) to detect all single-bit errors. For example, an SEDDED ("single error detection, double error detection") code may be used to detect and correct single-bit errors and, using an extra parity bit, to detect double-bit errors.

In addition to any known features for detecting and correcting errors that have occurred, the memory system 10 also includes novel features for implementing an error-reduction method for reducing the occurrence of errors. Illustrated components that may participate in aspects of the multi-level error reduction method include a fan 22 and a fan controller 24 for enforcing a selected fan speed. The fan 22 is an example of an air moving device that generates airflow, as indicated by parallel arrows. In another embodiment, the air moving device may comprise a blower. At least some of the airflow may be directed across the surface of the DIMMs 12 for cooling the DIMMs 12. The fan 22 is separated from the DIMMs 12 and is normally operated independently of the memory controller 16. The fan 22 may be provided anywhere in a computer system that houses the memory system 10, such as either a dedicated fan mounted to the motherboard 20 in close proximity to the DIMMs 12 or a chassis fan provided elsewhere in a computer chassis that houses the memory system 10 for generating airflow through the entire chassis. The fan 22 has a variable fan speed for imparting a correspondingly variable airflow rate. The variable fan speed allows the fan 22 to be operated at a plurality of different, nonzero fan speeds. In one implementation, the fan 22 may have two or more discrete speed states, such as a low-speed setting and a high-speed setting. In another implementation, the fan 22 may have a substantially continuously variable fan speed, such as may be provided by a rheostat.

One or more processors may additionally participate in the multi-level error reduction method. For example, a service processor 26 is provided, which has control functionality independent of an operating system. The service processor may be, for example, a baseboard management controller ("BMC") or Integrated Management Module ("IMM"). The service processor 26 may be used to control system components outside of an operating system, such as for monitoring component temperatures and power consumption and generating system alerts in response to detected faults. The service processor 26 in this embodiment contains control logic for controlling the implementation of the multi-level error reduction method. In implementing the error-reduction method, the service processor 26 will receive the SBE occurrences as inputs to the service processor 26, compare the SBE occurrences to one or more thresholds, and take a remedial action in response to the SBE rate reaching a threshold.

The service processor 26 contains error control logic for invoking a plurality of remedial actions. The error control logic includes, by way of example, error control logic 17 for selecting a refresh rate, control logic 18 for increasing an airflow rate, and control logic 19 for throttling the DIMMs 12. These remedial actions of increasing a refresh rate, increasing an airflow rate, and throttling the DIMMs 12 may be successively invoked and layered to provide a cumulative error-reducing effect, as further described below. The error reduction scheme serves to proactively reduce the error rate, and particularly the occurrence of SBEs, which reduces the number of errors that will need to be corrected. Thus, the features for identifying and correcting errors and the features for reducing the occurrence of errors in the memory system 10 are complementary processes that may increase the reliability of the memory system 10.

An electronic lookup table 30 is accessible by the service processor 26 and provides an ordered set of remedial actions. The table 30 may reside directly in memory contained within the service processor 26 or in memory separate from the service processor 26. The actions available for addressing a high error rate specifically for SBEs are listed in column 33. Column 31 indicates the order in which the remedial actions are to be invoked, and Column 32 provides an error rate threshold at which each action is to be invoked. Thus, the service processor 26 monitors an error rate in the DIMMs 12 and selectively invokes one or more of the actions provided in column 33, in the order provided in column 31, and in response to the error rate reaching the thresholds provided in column 32. The error rate may be expressed as an SBE frequency, i.e. the number of SBE in a unit time interval, in which case the thresholds listed in column 32 may be referred to as error rate thresholds. The values of the error rate thresholds are termed "refresh threshold," "airflow threshold," and "throttling threshold".

Each remedial action in column 33 may be initiated according to the respective control logic (17-19) provided on the service processor 26. Each remedial action, if performed separately, has the potential to reduce the error rate. As each successive remedial action is invoked, maintaining any previously invoked remedial action thereby provides a cumulative error-reducing effect. The first remedial action increases a refresh rate according to control logic 17 in response to the error rate reaching the refresh threshold. The second remedial action increases an airflow rate according to control logic 18 in response to the error rate reaching the airflow threshold. The third remedial action throttles the DIMMs 12 according to control logic 19 in response to the error rate reaching the throttling threshold. Components of the refresh rate control logic 17 and the throttling control logic 19 may reside on both the service processor 26 and the memory controller 16. For example, the component of the refresh rate control logic 17 on the service processor 26 may determine when to increase the refresh rate, while the component of the refresh rate control logic 17 on the memory controller 16 may control the actual refresh rate adjustment. Also, the component of the throttling control logic 19 on the service processor 26 may determine when to throttle the DIMMs 12, while the component of the throttling control logic 19 on the memory controller 16 actually performs the throttling.

The first remedial action to be invoked according to column 33 of the table 30 is to increase the memory refresh rate in response to the monitored error rate reaching or exceeding the refresh threshold. DRAM chips store information in a binary format of 0s and 1s. A DRAM memory cell includes a transistor and storage capacitor wherein the amount of charged stored is used to represent the binary 0 or 1. The charge on a memory cell bleeds off over time, requiring the memory cell to be repeatedly refreshed in order to accurately maintain the intended value. Refreshing a memory cell restores the charge on the memory cell to within the appropriate range of charge used to represent the intended value. The default refresh rate may depend on the particular DRAM chip used, which may vary from manufacturer to manufacturer. For example, a 128M×4 DRAM chip nominally requires 8192 refresh cycles to be executed every 64 milliseconds. However, a memory cell is not immune to occasional errors, even despite maintaining a specified refresh rate. The decreasing charge on a memory cell between refreshes poses a small but finite chance of an incorrect value being represented on the memory cell at any given instant, as manifested by a single-bit error. Increasing the refresh rate is expected to decrease the monitored error rate in the DIMMs 12. This action is invoked by control logic 17.

The second remedial action to be invoked according to column 33 of the table 30 is to increase an airflow rate in response to the monitored error rate reaching the airflow threshold. This action may be initiated by control logic 18, and facilitated in part by the fan 22 and fan controller 24 in cooperation with the service processor 26. The rate of single-bit errors generally increases with increasing temperature. Thus, increasing the airflow rate reduces the frequency of single-bit errors by decreasing the temperatures of the DIMMs 12. A signal may be generated by the service processor 26 in response to the error rate reaching the second threshold. The signal may be communicated to the fan controller 24, instructing the fan controller 24 to operate the fan 22 at an increased fan speed. The previously invoked action of operating the DIMMs 12 at an increased refresh rate may be maintained, thus providing the cumulative error-reducing effects of increasing the refresh rate together with increasing the airflow rate. Once the increased airflow rate is invoked, the airflow rate may be dynamically varied in relation to the error rate or temperature to provide a variable amount of error reduction.

The third remedial action to be invoked according to column 33 of the table 30 is to throttle the DIMMs 12 in response to the monitored error rate reaching the throttling threshold. This action may be initiated by the control logic 19. Throttling may be governed by firmware residing on the memory controller 16. Throttling the DIMMs 12 reduces the bandwidth of the DIMM 12, thereby reducing the power consumed by the DIMMs 12. Reducing the DIMM power consumption correspondingly reduces or limits the temperature of the DIMMs 12. Because SBEs tend to increase at high temperatures, throttling the DIMMs 12 to reduce temperatures may reduce the error rate. Again, as this third action of throttling the DIMMs 12 is invoked, the first two actions of increasing the refresh rate and increasing the airflow rate may be maintained, providing the cumulative effect of all three actions. Once the DIMM throttling is invoked, the degree to which the DIMMs 12 are throttled may be dynamically varied in relation to the monitored error rate or temperature, to provide a controlled amount of error reduction. The DIMMs 12 may be throttled to any extent necessary to enforce an upper limit on the SBE frequency, to the extent that policy considerations determine that reducing the error rate outweighs any performance or throughput reduction that may be incurred.

The single bit error rate threshold at which each remedial action is invoked may be the same or different than the SBE rate threshold for another remedial action. In an embodiment discussed in reference to FIG. 2, the refresh, airflow, and throttling thresholds are a frequency having the same value. Each successive occurrence of the error rate reaching that frequency value causes the next remedial action listed to be invoked. In an alternative embodiment discussed in reference to FIG. 3, the three thresholds are independent, wherein each remedial action is invoked in response to the error rate reaching the specific threshold value with which that remedial action is specifically associated.

The table 30 indicates the actions to be taken in response to the frequency of single-bit errors in the system 10. If a double-bit error (DBE) occurs during this process, several actions may be invoked simultaneously. For example, the remedial action taken in response to the DBE error rate reaching a DBE threshold can be any combination of increasing the refresh rate, increasing the airflow rate, and throttling the DIMMs 12. Often, but not always, the occurrence of a DBE is fatal to a server. The DBE threshold is in place to handle a DBE that is not fatal.

Figure 2:
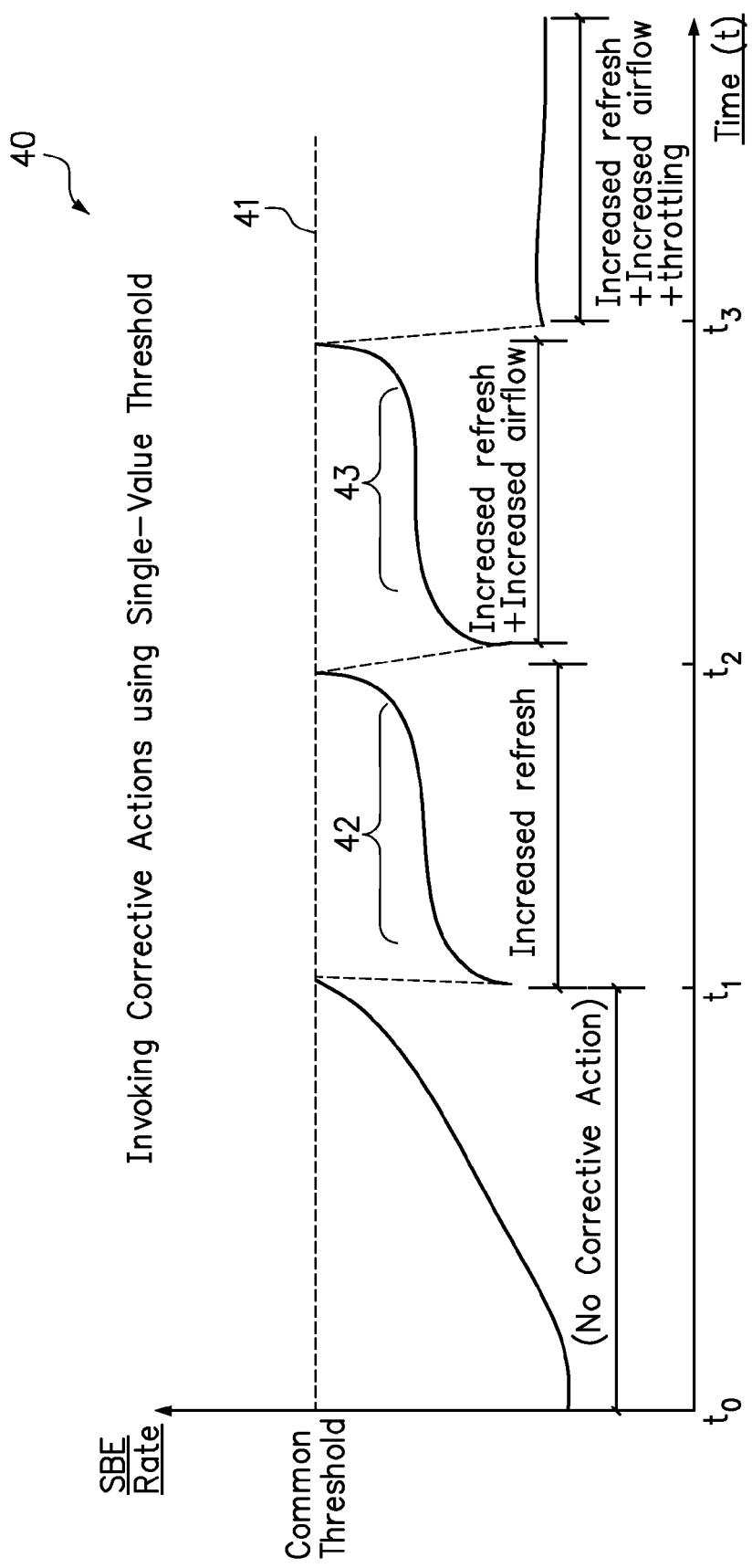
FIG. 2 is a graph illustrating an example of successively invoking remedial actions in a memory system in response to consecutive occurrences of an error rate reaching a single-value threshold.

FIG. 2 is a graph 40 illustrating an example of successively invoking remedial actions in a memory system in response to consecutive occurrences of an error rate reaching a single-value threshold. The error rate may increase due to any of a variety of causes of transient errors, such as increasing temperature, voltage, humidity, pressure, vibrations, power supply fluctuations, electromagnetic interference, ground loops, cosmic rays, and alpha particles. Depending on circumstances such as environmental conditions and the intensity at which it is operated, it is possible for the memory system 10 of FIG. 1 to be operated for extended periods without reaching the error rate threshold 41. However, to illustrate the successive layering of the remedial actions, the graph of FIG. 2 covers a scenario wherein the threshold 41 is reached three times, successively invoking all three actions shown in the table 30 of FIG. 1.

In this example, a single, predefined error rate threshold 41 is used for invoking each successively-invoked remedial action. The single error rate threshold 41 is represented by a dashed, horizontal line intersecting the vertical (SBE frequency) axis. With each occurrence of the SBE rate reaching the error rate threshold 41, a remedial action from column 33 of FIG. 1 is invoked according to the order provided in column 31, while any previously invoked action is maintained. It is intended that each error reducing action would reduce the SBE rate, but in the illustrated situation, conditions in the memory cause an initial reduction in the error rate followed by a continued increase in the error rate.

Beginning at an initial time "$t_0$," the SBE rate has some value of less than the threshold rate 41. Over the time segment from $t_0$ to $t_1$, the SBE frequency increases, which may be due to any of the various causes of transient errors. The SBE rate may increase, for example, in response to the DIMMs increasing in temperature as the memory system consumes power and generates heat. The first occurrence of the SBE rate reaching the threshold rate 41 is at time $t_1$. In response to this first occurrence of the SBE frequency reaching the threshold rate 41, the first action from table 30, column 33 (increasing the refresh rate) is automatically invoked. An immediate reduction in the monitored SBE rate results from increasing the refresh rate. Over the time segment from $t_1$ to $t_2$, the refresh rate remains increased relative to the refresh rate prior to $t_1$, to counter whatever conditions are causing the rising error rate.

During the time segment from $t_1$ to $t_2$, the refresh rate may also be dynamically adjusted to the extent possible, to delay a next occurrence of the SBE rate reaching the threshold 41. For example, as the monitored SBE rate continues to rise between times $t_1$ and $t_2$, the refresh rate is dynamically increased, within a range of variability of the refresh rate. The effect of countering an increasing error rate by dynamically adjusting the refresh rate is depicted in a relatively flat region 42.

Eventually, the range of variability of the refresh rate is exceeded, and the second occurrence of the error rate reaching the threshold 41 happens at time $t_2$. In response to this second occurrence of the error rate reaching the error rate threshold, the second remedial action (increasing airflow) is invoked. The increased airflow rate increases the cooling of the DIMMs, which lowers the temperature of the DIMMs and should correspondingly lower the SBE rate. During the time segment from $t_2$ to time $t_3$, the airflow rate may be dynamically adjusted to the extent possible to at least delay a third occurrence of the SBE rate reaching the threshold 41. For example, if the monitored SBE rate continues to increase from $t_2$ to $t_3$, the airflow rate may be dynamically increased to control DIMM temperatures and counter the tendency of the error rate to increase. The effect of countering an increasing SBE rate by dynamically adjusting the airflow rate is depicted in region 43.

The third occurrence of the SBE rate reaching the threshold rate 41 occurs at time $t_3$. In response to this third occurrence of the threshold rate being reached, the third remedial action (throttling the DIMMs) is invoked. The error rate should decrease, in part, as a direct result of the intensity of memory traffic decreases, wherein fewer opportunities for errors will result in a given time interval. The error rate may further decrease as an indirect result of the memory traffic decreasing, due to a decrease in temperature that would accompany the decreased memory traffic. The DIMMs may continue to be throttled for as long as necessary and to the extent necessary to ensure that the SBE frequency does not exceed the threshold. Throttling provides any desired level of control since the DIMMs may be throttled effectively to essentially zero memory traffic. However, doing so also reduces the memory throughput, such as the amount of data written to or read from the DIMMs in a unit time period.

Figure 3:
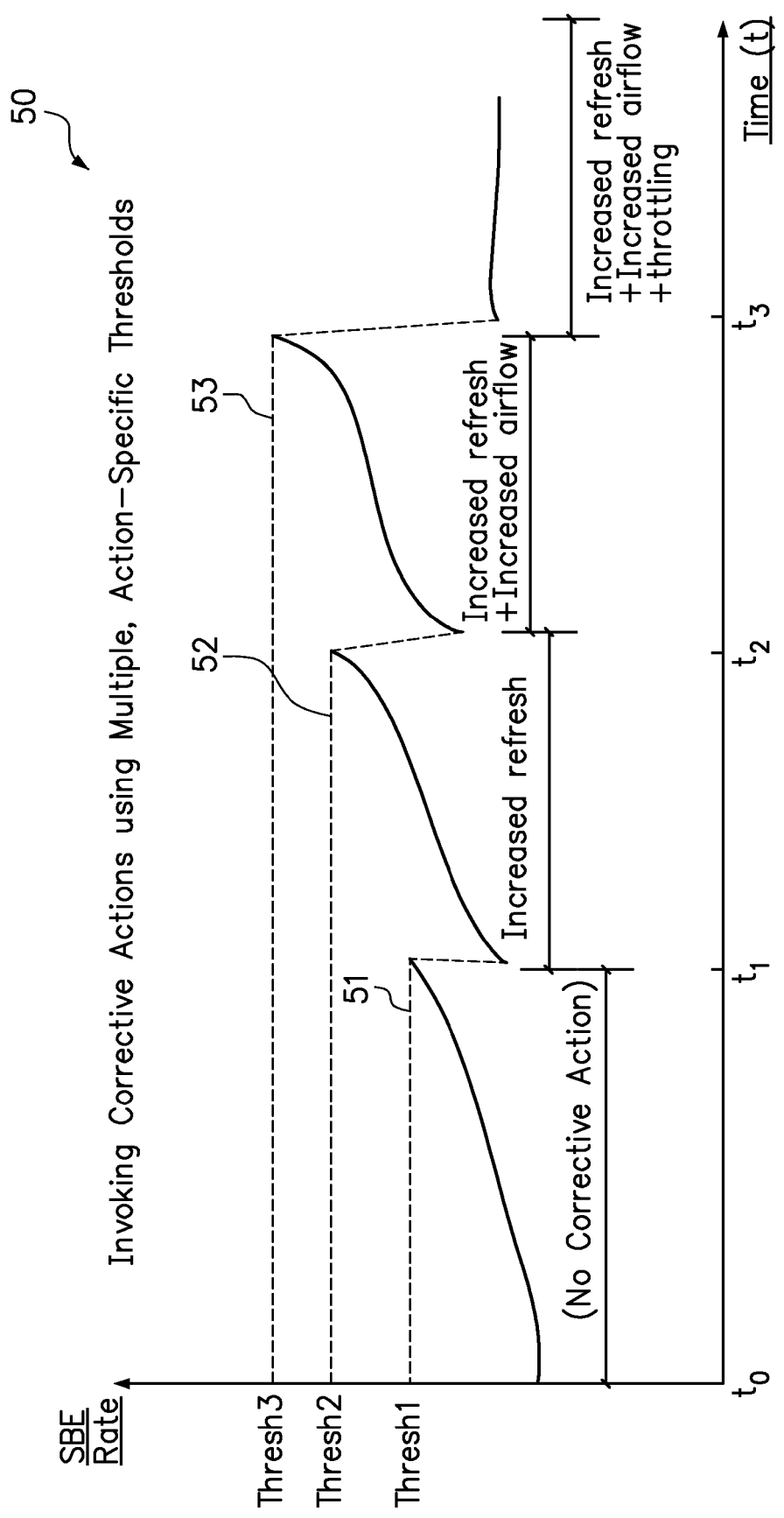
FIG. 3 is a graph illustrating an example of successively invoking remedial actions in a memory system in response to an error rate reaching independent first, second, and third error rate thresholds.

FIG. 3 is a graph 50 illustrating an example of successively invoking remedial actions in a memory system in response to an error rate reaching independent first, second, and third error rate thresholds. Rather than using the same threshold to successively invoke each action, a separate, independent threshold is specifically associated with each of the three remedial actions. In this example, the refresh, airflow, and throttling thresholds have independent, progressively larger values in the order listed, so that invoking each subsequent action requires the error rate to increase above the error rate at which the previous action was invoked. At time $t_1$, the error rate reaches the refresh threshold, in response to which the DIMM refresh rate is increased. The refresh rate may be dynamically varied between time $t_1$ and $t_2$, as discussed above. At time $t_2$, the error rate reaches the airflow threshold, which in this case has a greater value than the refresh threshold, in response to which an airflow rate is increased. The airflow rate may be dynamically varied between time $t_2$ and $t_3$. At time $t_3$, the error rate reaches the throttling threshold, which in this case has a greater value than the airflow threshold. In response to the error rate reaching the throttling threshold, the DIMMs are throttled.

Figure 4:
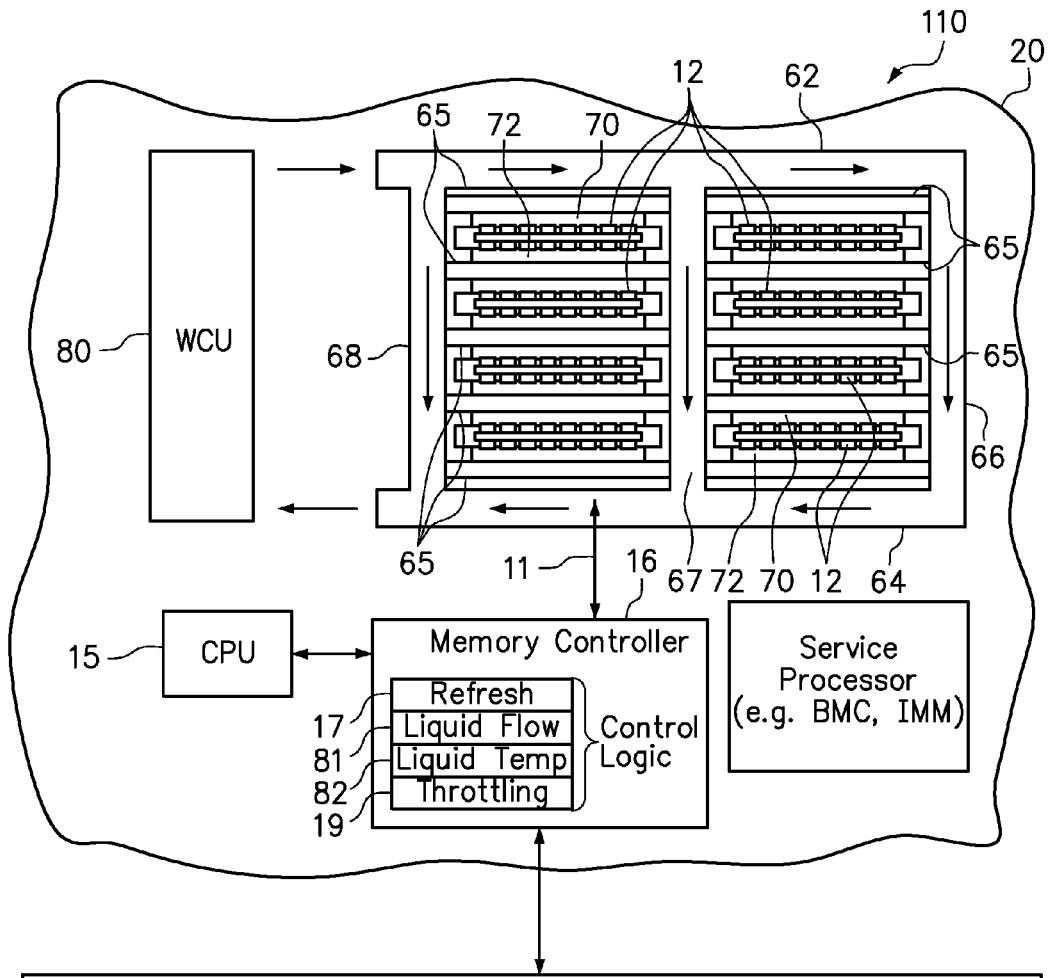
FIG. 4 is a schematic plan view of a liquid-cooled memory system implementing an error reduction method according to another embodiment of the invention.

FIG. 4 is a schematic plan view of a liquid-cooled memory system 110 on which a multi-level error reduction scheme is implemented according to another embodiment of the invention Like features of the liquid-cooled memory system 110 of FIG. 4 and the air-cooled memory system 10 of FIG. 1 are accorded the same reference numerals. The liquid-cooled memory system 110 includes liquid conduits carrying a circulating liquid. In this embodiment, the system 110 includes an inlet manifold 62, an outlet manifold 64, and three liquid conduits 66, 67, 68 in thermal contact with the ends of a plurality of heat pipes 65 that extend between each pair of adjacent DIMMs 12. In accordance with the system 110, each side of each DIMM 12 is cooled through thermal contact with a thermal interface material on the thermally conductive elements 70, 72, which are on opposing sides of the heat pipes 65. The configuration of the thermally conductive elements and the thermal interface materials may be comprised of any of a variety of thermally conductive materials known in the art, such as aluminum or copper. Heat from the DIMMs 12 follows a path through the thermal interface material, the thermally conductive elements 70, 72, and along the heat pipes 65 to the liquid conduits 66, 67, 68. Here, liquid conduits are positioned along both ends of the DIMMs 12 so that heat may be conducted to either end of each heat pipe. A liquid flow controller, embodied here as a water conditioning unit ("WCU") 80, controls the flow of a liquid coolant (in this case, liquid water), in a circulation loop from the inlet manifold 62 to the outlet manifold 64. The WCU 80 has a controllable flow rate for cooling the DIMMs 12, analogous to controlling the airflow rate in an air-cooled system.

The memory controller 16 as configured for use in this liquid-cooled system 110 includes a different set of control logic than for the air-cooled system 10 of FIG. 1 for reducing the occurrence of errors. As with the air-cooled system of FIG. 1, the control logic in the liquid-cooled system 110 includes control logic 17 for dynamically selecting a refresh rate and control logic 19 for dynamically throttling the DIMMs 12. The control logic in the liquid-cooled system 110 additionally includes control logic 81 for controlling a liquid flow rate and control logic 82 for controlling a liquid inlet temperature provided by the flow controller 80. The remedial actions in this liquid-cooled embodiment include increasing a refresh rate, increasing a liquid flow rate, decreasing a liquid inlet temperature, and throttling the DIMMs 12, each invoked in response to the error rate reaching a threshold. Again, these remedial actions may be successively invoked and layered to provide a cumulative error-reducing effect.

The example graphs of FIG. 2 and FIG. 3 illustrate scenarios wherein an error rate continues to increase and remedial actions are invoked in response to reaching successive thresholds. The systems 10 and 110 of FIGS. 1 and 2 may also be configured to selectively revoke or otherwise halt a previously invoked remedial action in response to a subsequent decrease in the error rate. A lower threshold may be programmed into a memory controller so that when the error rate drops below the threshold, an action is halted. The lower threshold may have a lower value than the threshold value used to invoke an action in response to an error rate increasing to above that threshold value, since the remedial actions serve to lower the error rate. Also, the actions may be revoked in the reverse order in which they were invoked. For example, if DIMMs are being throttled simultaneously with operating at an increased airflow rate and increased refresh rate in reference to FIG. 2, the first action to be revoked as the error rate drops would be to stop throttling the DIMMs. Subsequently, the airflow may be returned to a lower rate and the refresh rate may next be decreased.

An optional learning feature or step may be implemented to allow a system to select the thresholds at which each remedial action is to be invoked. In any given system, there may be a certain, acceptable level or range of single bit error rate that does not affect the overall performance and reliability of the system. This acceptable error rate may be system-specific. The learning feature may be implemented by monitoring the SBE over a period of time to determine this acceptable range of single bit error rates for a system, and then set the threshold to some value above that acceptable range.

Another optional feature or step includes running an empirical test on a specific system to determine the sensitivity of the single bit error rate to fan speed. The test may include executing a prescribed application on the target system while varying the fan speed or temperature. The data gathered from the test can be used to determine whether an acceptable SBE rate may be obtained at a lower fan speed. Such a test might even reveal that reducing the fan speed from a baseline value does not appreciably increase the single bit error rate. If at lower fan speeds, the occurrences do not increase to above an acceptable range, then the baseline fan speed may be reduced. The practical effect of this feature would be to tune the fan speed tables based upon the specific system configuration. Such a feature may result in power savings due to the decreased power required to operate the fan at the reduced baseline fan speed.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
monitoring a single-bit error rate in a memory module;
automatically invoking a first of an ordered set of remedial actions in response to a first occurrence of the single-bit error rate reaching a threshold; and
automatically invoking a next remedial action from the ordered set in response to each subsequent occurrence of the single-bit error rate reaching a threshold while maintaining any previously invoked remedial actions, wherein each remedial action invoked initially reduces the single-bit error rate to less than the threshold.

2. The method of claim 1, wherein the ordered set of remedial actions includes one or more of the group consisting of increasing a refresh rate of the memory module, increasing an air flow rate of an air moving device used to cool the memory module, and throttling the memory module.

3. The method of claim 2, further comprising:
one or both of dynamically varying the air flow rate in relation to the single-bit error rate after the remedial action of increasing the air flow rate and dynamically throttling the memory module in relation to the single-bit error rate after the remedial action of throttling the memory module.

4. The method of claim 1, wherein the ordered set of remedial actions includes one or more of the group consisting of increasing a liquid flow rate of a liquid cooling device used to cool the memory module, and reducing a liquid inlet temperature of the liquid cooling device.

5. The method of claim 4, further comprising:
one or both of dynamically varying the liquid flow rate in relation to the single-bit error rate after the remedial action of increasing the liquid flow rate and dynamically varying the liquid inlet temperature in relation to the single-bit error rate after the remedial action of reducing the liquid inlet temperature.

6. The method of claim 1, further comprising invoking each remedial action in response to the single-bit error rate reaching the same threshold value.

7. The method of claim 1, further comprising invoking each remedial action in response to the single-bit error rate reaching a separate threshold value, wherein each separate threshold value is independently associated with that remedial action.

8. The method of claim 1, further comprising:
detecting the occurrence of a multi-bit error in the memory module; and
simultaneously invoking at least two of the remedial actions in response to the occurrence of the multi-bit error.

9. The method of claim 1, further comprising:
monitoring the single-bit error rate over a period of time during which the system performs acceptably;
determining an acceptable range of the single-bit error rate from the monitored single-bit error rate during the period of time; and
automatically setting the threshold to a value above that acceptable range.

10. The method of claim 1, further comprising:
executing a prescribed application on the target system while varying a fan speed below a baseline fan speed; and
reducing the baseline fan speed in response to determining that an acceptable value of the single-bit error rate may be obtained at the reduced baseline fan speed.

11. A method, comprising:
monitoring a single-bit error rate in a memory module;
automatically increasing a refresh rate using a memory controller in response to the single-bit error rate reaching a first threshold rate; and automatically increasing an airflow rate from an air moving device separate from the memory module and operable independently of the memory controller in response to the single-bit error rate reaching a second threshold rate while maintaining the increased refresh rate.

12. A computer program product including computer usable program code embodied on a non-transitory computer usable storage medium, the computer program product comprising:
    computer usable program code for monitoring a single-bit error rate in a memory module;
    computer usable program code for automatically invoking a first of an ordered set of remedial actions in response to a first occurrence of the single-bit error rate reaching a threshold; and
    computer usable program code for automatically invoking a next remedial action from the ordered set in response to each subsequent occurrence of the single-bit error rate reaching a threshold while maintaining any previously invoked remedial actions, wherein each remedial action invoked initially reduces the single-bit error rate to less than the threshold.

13. The computer program product of claim 12, wherein the ordered set of remedial actions includes one or more of the group consisting of increasing a refresh rate of the memory module, increasing an air flow rate of an air moving device used to cool the memory module, and throttling the memory module.

14. The computer program product of claim 13, further comprising:
    computer usable program code for one or both of dynamically varying the air flow rate in relation to the single-bit error rate after the remedial action of increasing the air flow rate and dynamically throttling the memory module in relation to the single-bit error rate after the remedial action of throttling the memory module.

15. The computer program product of claim 12, wherein the ordered set of remedial actions includes one or more of the group consisting of increasing a liquid flow rate of a liquid cooling device used to cool the memory module, and reducing a liquid inlet temperature of the liquid cooling device.

16. The computer program product of claim 15, further comprising:
    computer usable program code for one or both of dynamically varying the liquid flow rate in relation to the single-bit error rate after the remedial action of increasing the liquid flow rate and dynamically varying the liquid inlet temperature in relation to the single-bit error rate after the remedial action of reducing the liquid inlet temperature.

17. The computer program product of claim 12, further comprising computer usable program code for invoking each remedial action in response to the single-bit error rate reaching the same threshold value.

18. The computer program product of claim 12, further comprising computer usable program code for invoking each remedial action in response to the single-bit error rate reaching a separate threshold value, wherein each separate threshold value is independently associated with that remedial action.

19. The computer program product of claim 12, further comprising:
    computer usable program code for detecting the occurrence of a multi-bit error in the memory module; and
    computer usable program code for simultaneously invoking two or more of the remedial actions in response to the occurrence of the multi-bit error.

20. The computer program product of claim 12, further comprising:
    computer usable program code for monitoring the single-bit error rate over a period of time during which the system performs acceptably;
    computer usable program code for determining an acceptable range of the single-bit error rate from the monitored single-bit error rate, during the period of time; and
    computer usable program code for automatically setting the threshold to a value above that acceptable range.

* * * * *